United States Patent [19]
Noya et al.

[11] Patent Number: 5,204,963
[45] Date of Patent: Apr. 20, 1993

[54] METHOD AND APPARATUS FOR A BACKUP POWER CONTROLLER FOR VOLATILE RANDOM ACCESS MEMORY

[75] Inventors: Eric S. Noya, Groton; Randy M. Arnott, Clinton, both of Mass.

[73] Assignee: Digital Equipment Corporation, Maynard, Mass.

[21] Appl. No.: 626,586

[22] Filed: Dec. 7, 1990

[51] Int. Cl.[5] ............................................. G06F 12/16
[52] U.S. Cl. ................................... 395/750; 365/229
[58] Field of Search .......................... 364/273.4, 948.5; 371/14, 66; 365/228, 229; 395/750

[56] References Cited

U.S. PATENT DOCUMENTS

| | | | |
|---|---|---|---|
| 4,065,676 | 12/1977 | Elias | 307/66 |
| 4,458,307 | 7/1984 | McAnlis et al. | 364/200 |
| 4,645,943 | 2/1987 | Smith, Jr. et al. | 307/150 |
| 4,709,202 | 11/1987 | Koenck et al. | 320/43 |
| 4,730,121 | 3/1988 | Lee et al. | 365/229 X |
| 4,757,505 | 7/1988 | Mannington et al. | 371/66 |
| 4,841,474 | 6/1989 | Zandveld et al. | 364/900 |
| 4,845,419 | 7/1989 | Hacker | 320/39 |
| 4,860,185 | 8/1989 | Brewer et al. | 363/41 |
| 4,874,960 | 10/1989 | Cybela | 307/64 |
| 4,885,521 | 12/1989 | Crampton | 320/14 |
| 4,908,790 | 3/1990 | Little et al. | 364/900 |
| 4,959,774 | 9/1990 | Davis | 364/200 |
| 4,985,870 | 1/1991 | Faraci | 365/299 X |
| 5,021,983 | 6/1991 | Nguyen et al. | 364/707 |
| 5,079,741 | 1/1992 | Kimura | 365/299 X |

*Primary Examiner*—Robert L. Richardson
*Attorney, Agent, or Firm*—Dirk Brinkman; Barry N. Young; Ronald E. Myrick

[57] ABSTRACT

A method and apparatus for a software actuable backup power controller for selectively controlling power to a volatile random access cache memory. If memory does not contain any data that needs to be retained during a primary power failure the controller isolates memory from the backup power supply during the power failure. Only when the memory contains data to be retained during a power failure will memory be treated as non-volatile and is the backup power supply connected to memory on primary power failure. By selectively enabling the backup power supply with software commands from the computer, a suitable cache memory can be constructed with a compact non-rechargeable battery.

16 Claims, 4 Drawing Sheets

METHOD AND APPARATUS FOR A BACKUP POWER CONTROLLER FOR VOLATILE RANDOM ACCESS MEMORY

FIELD OF THE INVENTION

This invention relates to a volatile random access memory and is more particularly concerned with a software actuable backup power controller for such memory.

BACKGROUND OF THE INVENTION

Computer systems can accelerate database performance by utilizing a cache memory for buffering data transfers between the computer system and stable storage such as a hard disk drive. Cache memory has considerably better data access and data transfer characteristics than disks drives. Presumably, more frequently used data is more likely to be stored in cache memory. Also, data transfers between cache memory and disk can further be optimized by resequencing disk transfers to minimize positional delays inherent in a moving head disk drive. However, cache memory is volatile, that is, with the power removed, the data contents are removed.

An essential feature for a volatile cache memory is a suitable amount of random access memory (RAM) connected to a primary power supply. The RAM components are typically mounted on a printed circuit board (PCB) along with a backup power supply to power the volatile RAM during a failure in the primary power supply. By mounting the backup power supply on the PCB along with the RAM components the PCB can be removed from the system to facilitate servicing. Data retained in cache memory by a backup power supply can be subsequently written to stable storage when primary power is restored, thus maintaining the integrity of the database.

Failures in the primary power supply, such as voltage spikes, current dips or total power loss are typically sensed by electronic circuitry coupled to the primary power supply. This circuitry automatically disables the primary power supply when such failures are detected and almost simultaneously enables the backup power supply.

Since the lifetime of a cache memory can be as long as ten years, rechargeable batteries are generally used as the backup power supply. Traditional backup power supplies use rechargeable nickel cadmium batteries suitable for mounting on a PCB. A nickel cadmium battery can provide backup power from one to three months. Therefore, for long term backup power, rechargeable backup power supplies generally include multiple hierarchically coupled batteries to extend the useful backup time to about a year. However multiple rechargeable batteries increase cost and circuit space for a RAM cache circuit board. For example, to provide backup power to 1 megabytes of RAM for a year would require at least 6 nickel cadmium batteries consuming approximately 90 sq. cm of circuit board space.

Therefore, it is desirable that a volatile cache memory be constructed with a low cost compact and long life backup power supply.

SUMMARY OF THE INVENTION

In accordance with the invention, there is provided a backup power controller that, under control of the computer system, selectively enables the backup power supply only if data in cache memory must be retained to preserve the integrity of the database. The controller includes logic which isolates the backup power supply from the cache memory when there is a primary power failure and the data in cache memory does not need to be retained, and, conversely, enables the backup power when the data in cache memory needs to be retained. In the present invention the computer system software communicates with the backup power controller to selectively determine if the backup power supply should be enabled when a failure in the primary power supply is detected. The system includes power sensing logic to detect power failures in the primary power supply, logic for enabling isolation of the backup power supply or battery, and power coupling logic for enabling the connection of the backup power supply to the cache in the event of primary power failure or removal.

In one aspect of the invention, the backup power supply is enabled only in those instances in which the computer has determined that backup is needed, thus conserving the battery power.

These and other features and advantages of the present invention will become apparent from a reading of the detailed description when taken in conjunction with the attached drawings in which like reference numerals refer to like elements in the several views.

DETAILED DESCRIPTION OF THE PREFERRED EMBODIMENT

Figure 1:
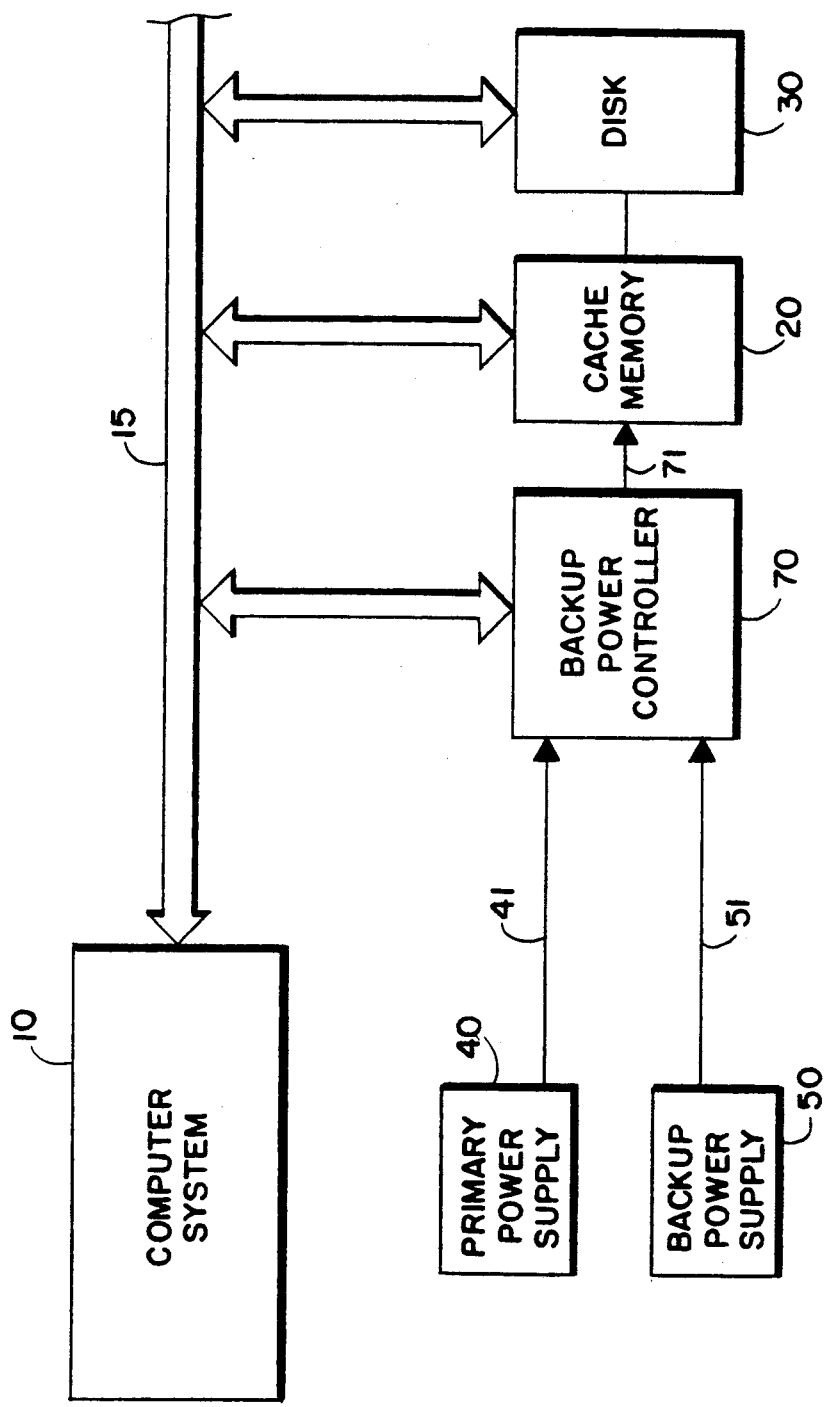
FIG. 1 is a block diagram of a computer system employing the backup power controller according to the present invention.

Referring now to the drawings, and particularly to FIG. 1, there is shown a computer system 10 coupled to a cache memory 20 and a disk drive 30 over a system bus 15. The computer system 10, system bus 15, cache memory 20 and disk drive 30 are conventional and are sufficiently known so as not to require detailed description herein.

Disk drive 30 contains data which is accessed by computer system 10 during its processing operations. To accelerate disk drive 30 read and write operations, computer system 10 stores frequently used data in cache memory 20. Data transfers to cache memory 20 can be processed much quicker than data transfers to disk drive 30. A suitable cache memory can be constructed with volatile CMOS RAM components mounted on a PCB having a storage capacity of about 1 megabytes.

When cache memory 20 contains data not yet stored on disk drive 30 there must be a continuous supply of power to the volatile RAM components to maintain the logical 0 or logical 1 states in the semiconductor memory cells. Therefore, in addition to being coupled to a primary power supply 40, cache memory 20 is also adapted for selectively coupling to a backup power supply 50. The present invention uniquely controls the supply of power to cache memory 20 with a backup power controller 70. Controller 70 is coupled to a primary power supply 40 and a backup power supply 50 by lines 41 and 51 respectively. Controller 70 is also coupled to computer system 10 over system bus 15. As will be described, the battery or backup power supply 50 is normally disabled, via controller 70, from connection to cache memory 20, and enabled, via controller 70 by means of computer system 10, for connection under prescribed conditions.

Figure 2:
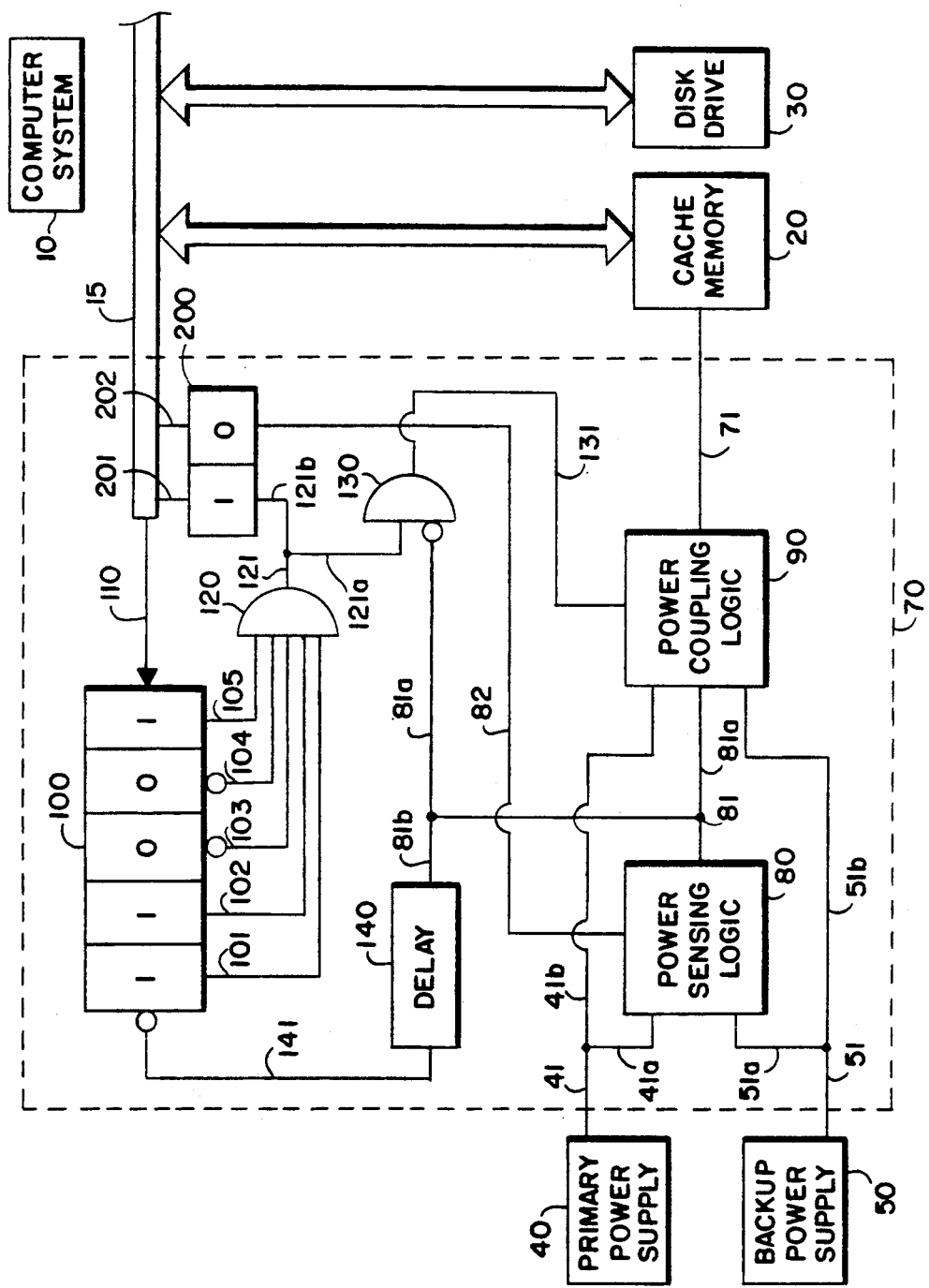
FIG. 2 is a detailed block diagram of the backup power controller according to the present invention.

Referring now to FIG. 2, there is shown a detailed block diagram of controller 70 (shown enclosed in broken lines). External to the controller 70 are the primary power supply 40 and the battery or backup power supply 50, as well as, of course the computers system 10, the cache memory 20 and the disk drive 30. Within the controller 70 are a power sensing logic unit 80 and a power coupling logic unit 90 interconnected between the two power supplies 40, 50 and the cache memory 20, as will be hereinafter described. A five bit register 100 and a two bit status register 200 along with AND gates 120, 130 and a delay 140 are provided.

The power sensing logic 80 has the inputs thereof coupled over lines 41a and 51a, respectively, to lines 41 and 51 of the primary power supply 40 and backup power supply 50, respectively. The sensing logic 80 continuously monitors primary power supply 40 on line 41a and the battery or backup power supply 50 on line 51a, respectively. One output of the power sensing logic 80 appears on line 81 which, via line 81a, is coupled as a first input to the power coupling logic 90, this output being determined by the state of the primary power supply. The second and third inputs to the power coupling logic are supplied from the primary power supply 40 via line 41b and the backup power supply 50 via line 51b. A fourth enabling input is provided to the power coupling logic 90 via line 131 which is the output of the AND gate 130. A second output of the power sensing logic appears on line 82, this output being determined by the state of the battery or backup power supply 50.

The controller 70 includes a 5 bit controller shift register 100 coupled to system bus 15 by line 110 for receiving, from the computer 10, an appropriate predetermined code, which, provides an output over each of the five leads 101-105 which are coupled as the five inputs to the AND gate 120, the output 121 of which is coupled as a first input to the two input AND gate 130 as well as providing a bit to one location of the status register 200, that is, the first bit location of the status register 200 is indicative of the output state of the AND gate 120. The other input to the inverting input of AND gate 130 is provided over lead 81a which receives the output of power sensing logic 80 via line 81. This output appearing on line 81 is also coupled through a delay 140 to the inverting reset input of the register 100 over line 141.

For reasons which will become obvious, the status register provides two bits of information to computer system 10 which are constantly being monitored over lines 201 and 202. The signal appearing on line 121 to the first bit location of register 200 is an indication to the system 10 that the controller mechanism 70 is enabled or armed when the bit is a logical "1". When the mechanism is disabled, the bit location is a logical "0". The signal on line 82 provides one bit of information to the two bit status register 200, that is, the second bit location of the register 200 is indicative of battery condition. When the battery is in good condition, the bit is a logical 1 and, when the battery fails, the bit is a logical "0".

Proceeding now to the discussion of the operation of the system. The controller mechanism 70 is enabled or armed by loading shift register 100 with a predetermined code which, by way of example, includes the specific bit pattern "11001", as shown in FIG. 2. The output signals from the first, second and fifth cells of shift register 100 are presented as a high signal to a first AND gate 120 by lines 101, 102 and 105 respectively, when these cells contain a logical 1. The inverted output signals from the third and fourth cells of shift register 100 are presented as high signals to AND gate 120 by lines 103 and 104 respectively, when these cells contain a logical 0. Therefore, only if shift register 100 contains "11001" will the output signal from AND gate 120 on line 121 be an enabling high signal which, as described, will cause a "1" in the first bit location of register 200.

The output from AND gate 120 is coupled as one input of the two input AND gate 130 by line 121a with the other input being provided over line 81a, as an inverted signal from the power sensing logic 80.

In the normal state of operation, when power is present on line 41a (i.e., the primary power supply 40 is operating normally) the output from sensing logic 80 on line 81 is nominally high. This, in turn, is provided as a low input to AND gate 130 due to the inverting input. When a power failure is detected on line 41a the output from sensing logic 80 on line 81 changes to nominal low, thus driving the input to AND gate 130 high.

The power coupling logic 90 continuously senses the state of the primary power supply 40 as well as the backup power supply 50 and is enabled, at least in part, by the state of the output of the power sensing logic 80 appearing at its input on line 81a. As long as the signal on line 81a remains high, power coupling logic 90 couples cache memory 20 to the primary power supply 40 via lines 71 and 41b. In this condition, the battery or backup power supply 50 is disconnected.

Figure 3:
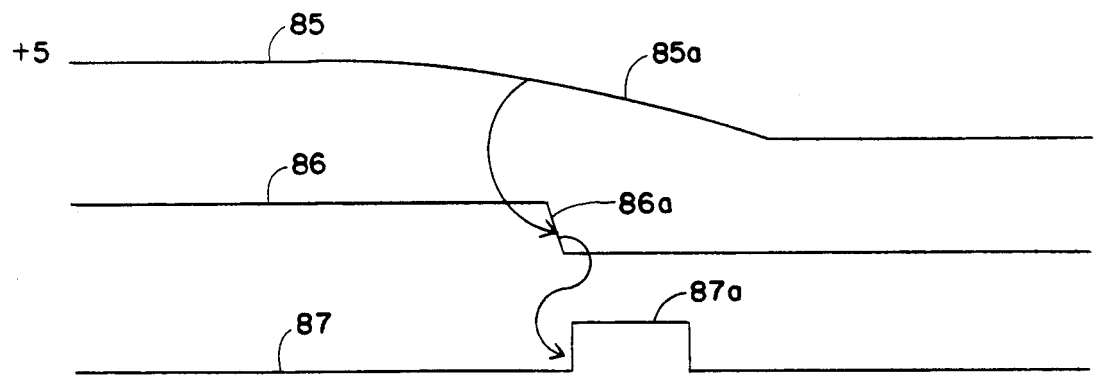
FIG. 3 is a timing diagram of signals and voltage used in the backup power supply isolation of the controller of FIG. 2.

Referring briefly to FIG. 3, curves 85, 86 and 87, respectively depict the voltage of the primary power supply 40, the output signal on line 81a, and the output of AND gate 130. With the controller 70 enabled or armed as previously described, the first input over line 121a to AND gate 130 is high. In the event of primary power supply 40 failure, as depicted at curve portion 85a, as soon as the drop in voltage is sensed, the output of power sensing logic 80 goes low, as depicted by curve portion 86a. This output going low is sensed at line 81 and provided, via line 81a, as a high input to the second input of AND gate 130, at the conclusion of which the output of AND gate 130 appearing on line 131 goes high, as depicted by the pulse at curve portion 87a. This pulse 87a remains high for a time duration equivalent to the time duration of the delay of delay 140 which then resets controller shift register 100 via line 141. When shift register 100 is reset, the enabling output of AND gate 120 is removed, which is indicated to the computer system 10 over line 201 by a "0" bit appearing in the first bit position of status register 200.

In the present invention, via controller 70, cache memory 20 is selectively coupled to back up power supply 50 or to backup power supply 50, depending on the state of the primary power failure signal which appears on line 81 and is depicted by curve 86. Controller 70 also isolates or disables connection of the battery or backup power supply 50 to the cache memory 20 when power fails (line 81 goes low) if an output from AND gate 130 is sensed before the change over from primary power supply 40 to battery or backup power supply 50.

If the computer system determines that data in cache memory 20 needs to be preserved, the controller mechanism 70 is armed by use of the predetermined code set in the controller shift register 100. This than provides a high input or enabling signal via line 121a to AND gate 130. Upon power failure as described with reference to FIG. 3, a low signal appears at the output of power sensing logic 80 which is then provided, via line 81a to the second inverted input of AND gate 130 and simultaneously to the input of delay 140. The output of AND gate 130 then goes high, and is provided over lead 131 to the power coupling logic 90 to instruct the change over from primary power supply 40 to backup power supply 50 to thus preserve the contents of the cache memory 20. The pulse propagating through delay 140 then resets the register 100.

In the present invention the delay of delay circuit 140 is approximately 100 nanoseconds. The output from the delay circuit 140 is coupled to the inverted reset logic input of shift register 100 by line 141. If the isolation mechanism is armed, the output signal from AND gate 130 will remain high for the length of time it takes the power fail signal on line 81b to propagate through delay circuit 140 resetting or disarming shift register 100.

In accordance with the present invention, the computer system 10 communicates with the controller 70 via register 100 to selectively determine if backup battery power 50 will be needed for any information then in storage in cache 20. The computer system 10 then receives information from the controller 70 via the two bit status register 200 as to the condition of arming or enabling of the controller 70, as well as condition of the battery or backup power 50. Any accidental writes to the shift register 100 by faulty software or hardware, be it a 1 or a 0 will disarm the controller mechanism 70. This, in turn, will be read by the computer via line 201 for resetting or enabling of register 100, as needed.

For example, the software which writes the data in cache memory 20 to disk drive 30 as part of a system shutdown procedure can instruct controller 70, via register 100, to connect cache memory 20 to backup power supply 50 when primary power is subsequently turned off. Similarly, software which transfers data between cache memory 20 and disk drive 30 during normal database operations can determine if, at any instant, cache memory 20 contains data not already stored on disk drive 30, that is, the software provides a signal to the controller 70 via register 100 that the cache contains the current version of the data which has not yet been written to disk. In effect, for these circumstances, controller 70 is armed by loading shift register 100 with the correct code for enabling connection of backup power supply 50 to cache memory 20, which will be triggered by any subsequent failure in primary power supply 40.

If subsequent connection of cache memory 20 to the backup power supply 50 is not needed, the computer system 10 can then disable the controller 70 by writing any other value to the register 100.

At all times, the computer system 10 can monitor the status of the battery or backup power supply 50 and the state of register 100 by the two bit read-only status register 200. The first bit cell of status register 200 is coupled to the output of AND gate 120 by line 121b. A high signal on line 121b, indicating that the controller mechanism is armed, will set the first bit cell to a logical 1, as shown in FIG. 2. The first bit cell in status register 200 is presented system bus 15 by line 210. The second bit cell of status register 200 is coupled to sensing logic 80 by line 82. A low signal on line 82, indicating that backup power supply 50 has insufficient power to sustain cache memory 20 during a power failure, will set the second bit cell to a logical 0, as shown in FIG. 2. The second bit cell in status register 200 is presented to system bus 15 by line 202. In this instance, the computer system 10 can initiate a warning to the system operator concerning the battery condition.

Figure 4:
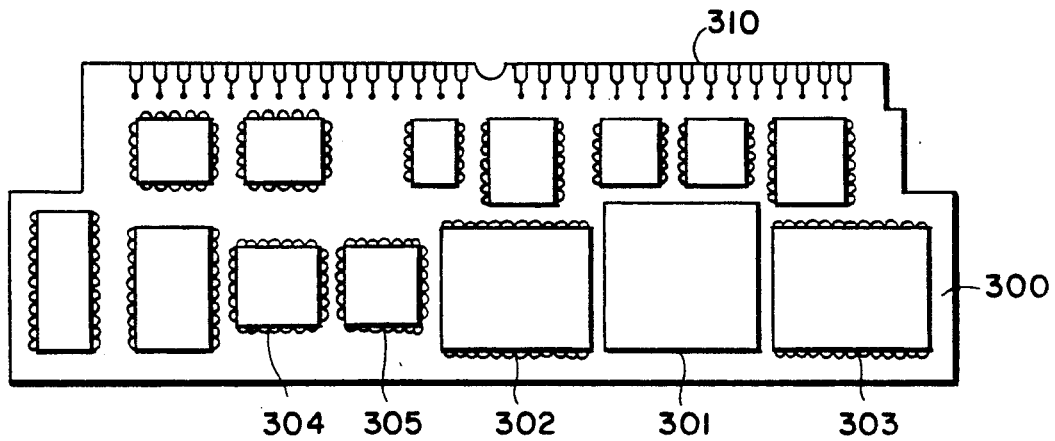
FIG. 4 is planar view of a first side of a printed circuit board constructed with volatile RAM, battery and backup power controller according to the present invention.
Figure 5:
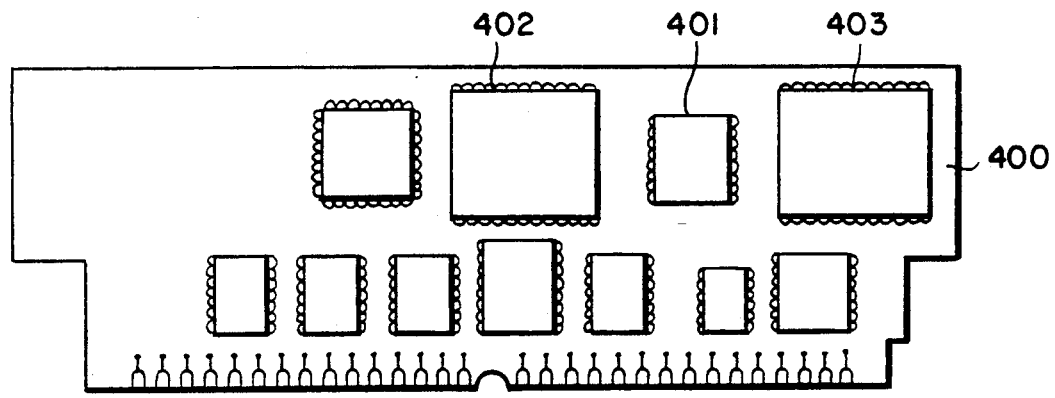
FIG. 5 is planar view of the second side of the printed circuit board of FIG. 4.

Referring now to FIGS. 4 and 5, there is shown a specific construction of a cache memory with a controller and a backup battery. As shown in FIG. 4, mounted on the first side of a printed circuit board is a non-rechargeable lithium battery 301. In the present invention, and by way of example, the battery is a 3V RENATA Power Module 175-0. The battery consumes approximately 5 sq. cm of circuit board space. Also mounted on the first side are two CMOS memory chips labeled 302 and 303 respectively. The present invention uses Hitachi 9007 HM628128LPF-8 CMOS memory chips. Also mounted on the first side are two PAL chips, implementing the control logic described herein, labeled 305 and 306 respectively. Specifically this invention uses Advanced Micro Devices AMD PAL-CE22V10H components. Other components shown in FIG. 3 and not specifically labeled perform memory logic functions known in the art. The printed circuit board measures approximately 13 cm along the long axis and 4 cm along the short axis. One edge of the printed circuit board is constructed with plated connecting fingers 310 suitable to inserting and connecting with a system bus.

As shown in FIG. 5, mounted on the second side of the printed circuit board 400 is a logic chip 401 capable of sensing and switching power from two power sources. Specifically, this invention uses a Dallas Semiconductor DS1259S. Also mounted on the second side are two additional memory chips, respectively labeled 402 and 403. Other components shown in FIG. 5 and not specifically labeled perform memory logic functions known in the art.

The present invention may be embodied as a removable printed circuit assembly including memory components, a software programmable backup power controller, and a low cost non-rechargeable compact lithium battery capable of providing back-up power, without replacement, to the cache memory for a period of time comparable to the life of a computer system.

It should be recognized that the specific names given to components, and the specific arrangements shown in the drawings do not suggest any specific construction of a programmable backup power controller. For instance, the RAM, sensing, coupling and controller logic may well be integrated into a single semiconductor chip with an embedded non-rechargeable battery. It should also be recognized that means other than system software may determine if the data in cache memory should be retained or not.

In accordance with the present invention there has been shown and described a computer controlled power switching system for use with a cache memory.

For example, if data in cache memory is written to disk as part of a normal system shutdown procedure, the controller can disable connection of the backup power supply to the cache memory when primary power is removed. Similarly, the controller can disable connection of the backup power supply to the cache memory at the instant of an unanticipated power failure if cache memory does not contain any data which needs to be retained. Also, the controller can disable connection of the backup power supply to the cache memory when the cache memory board is removed from the computer system during system maintenance or repair. Additionally with this invention, cache memory can be disconnected from the on-board backup power supply at the time cache memory is manufactured. Thus, power is not unnecessarily drained when the cache memory part is in storage or transit. Not until the memory is actually installed in a computer system much later will the backup power supply ever be enabled.

Only in the generally few instances of an unanticipated primary power failure does the backup power supply need to be connected to cache memory. With this invention a single non-rechargeable battery can be a suitable backup power supply for a cache memory. By using a computer system responsive backup power controller, by use of computer commands it can be selectively determined if the data in cache memory needs to be retained in the event of a primary power failure. Thus the battery is not unnecessarily drained as is the case in traditional automatically activated power backup supplies requiring bulky rechargeable batteries.

While the present invention has been shown and described with reference to a preferred embodiment, it is to be understood by those skilled in the art that the foregoing and other changes in form and detail may be made therein without departing from the spirit and scope of the present invention, and that the invention is not limited to this embodiment. The invention, therefore, is to be defined according to the following claims.

What is claimed is:

1. Apparatus for providing power to a volatile random access memory in a computer system comprising:
    a circuit board;
    volatile random access memory mounted on said circuit board;
    a primary power source normally connected to said memory;
    a backup power source mounted on said circuit board normally disconnected from said memory;
    first means mounted on said circuit board, said first means connected to the computer system, responsive to a command from the computer, for enabling said backup power source in the event that said memory stores data that must be preserved;
    second means mounted on said circuit board, said second means connected to said primary power source, for sensing failure in said primary power source; and
    coupling means, mounted on said circuit board, said coupling means connected to said first and second means, responsive to said first means on enablement and to said second means on sensing of a failure in said primary power source for disabling said primary power source and connecting said backup power source to said memory for enabling preservation of data in said memory on primary power source failure.

2. The apparatus according to claim 1 wherein said first means includes a shift register for receiving a predetermined coded command from the computer system for selectively enabling said backup power source.

3. The apparatus according to claim 2 wherein said second means includes power sensing logic for monitoring the status of said primary power source.

4. The apparatus as in claim 3 wherein said backup power source is a battery and said sensing means also monitors the condition of said battery.

5. The apparatus according to claim 4 further including means for providing to the computer information on the condition of said battery.

6. The apparatus according to claim 4 wherein said battery in a non-rechargeable battery.

7. The apparatus according to claim 1 wherein said backup power source is a battery.

8. The apparatus according to claim 1 wherein said coupling means includes a semiconductor power switching device.

9. The apparatus according to claim 1 wherein said backup power source is a non-rechargeable battery and wherein said first means, said second means, and said coupling means, said battery and said memory are formed as an integrated semiconductor package.

10. A controller in a computer system for enabling selective coupling of one of a first and second sources of power to a volatile random access memory comprising:
    a circuit board having the memory mounted thereon;
    a first power source connected to the memory;
    a second power source mounted on said circuit board;
    sensing means, mounted on said circuit board, said sensing means connected to said first power source, for detecting failures in said first power source;
    means, mounted on said circuit board responsive to the computer system for providing a first signal indicative of a determination that data stored in the memory are to be preserved and a second signal indicative of a determination that said data stored in the memory are not to be preserved; and
    coupling means, mounted on said circuit board, said coupling means connected to said sensing means and to said signaling means, responsive to said first and second signals and the detection of a failure of said first power source by said sensing means, for respectively enabling connection on said first signal or disabling connection on said second signal of said second power source to the memory on failure of said first power source.

11. The controller according to claim 10 wherein said second power source is a non-rechargeable battery.

12. The controller according to claim 10 wherein said means responsive to the computer system includes a register for receiving a predetermined command from said computer system and an AND gate for providing said first signal on receipt thereof.

13. The controller according to claim 12 wherein said sensing means provides a second input to said AND gate on detection of failure in said first power source and said coupling means is responsive to the output of said AND gate.

14. A method for powering a volatile random access memory capable of retaining data comprising:
    supplying primary power to a volatile random access memory mounted on a circuit board;
    sensing the condition of said primary power for failures;

determining if the data in said memory should be retained when failures are sensed in said primary power; and upon sensing of a failure condition, disabling said supplying of primary power to said memory, and connecting a backup power source to said memory, said back up power source mounted on said circuit board when said step of determining determines that the data should be retained or isolating said backup power if the step of determining determines that the data in said memory should not be retained.

15. Apparatus for supplying power to a volatile random access memory storing data comprising:
   means for sensing if the data should be preserved;
   means for sensing a primary power failure; and
   means, responsive to a determination if the data should be preserved and a failure of said primary power, for switching to a backup power.

16. The apparatus as in claim 15 further including register mans for receiving a predetermined coded command indicating if the data should be preserved.

* * * * *